(12) United States Patent
Matsuzaki et al.

(10) Patent No.: US 7,455,326 B2
(45) Date of Patent: Nov. 25, 2008

(54) CONNECTION TUBE FOR FUEL TANK

(75) Inventors: Tohru Matsuzaki, Tochigi (JP); Shinya Murabayashi, Saitama (JP); Naomasa Kaneko, Saitama (JP); Tadahisa Nakamura, Saitama (JP)

(73) Assignees: Yachiyo Kogyo Kabushiki Kaisya, Sayama-shi (JP); Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 11/347,574

(22) Filed: Feb. 6, 2006

(65) Prior Publication Data
US 2006/0185760 A1    Aug. 24, 2006

(30) Foreign Application Priority Data
Feb. 8, 2005    (JP) .............................. 2005-031885

(51) Int. Cl.
*F16L 13/02*    (2006.01)
(52) U.S. Cl. .................. 285/288.1; 285/141.1; 285/423
(58) Field of Classification Search ................. 285/423, 285/288.1, 286.1, 201, 141.1; 137/202, 43
See application file for complete search history.

(56) References Cited

U.S. PATENT DOCUMENTS

| | | | | |
|---|---|---|---|---|
| 6,289,915 B1 * | 9/2001 | Nulman et al. ................ 137/43 |
| 6,386,244 B2 * | 5/2002 | Brown et al. ................... 141/1 |
| 6,408,867 B2 * | 6/2002 | Aoki et al. .................... 137/202 |
| 6,502,607 B2 * | 1/2003 | Brown et al. ................... 141/1 |
| 6,508,263 B1 * | 1/2003 | Jahnke et al. ................ 137/202 |
| 6,733,048 B2 * | 5/2004 | Kurihara et al. ............. 285/423 |
| 6,755,206 B2 * | 6/2004 | Nishi et al. .................. 137/202 |
| 6,808,209 B2 | 10/2004 | Nakaya et al. |
| 6,834,771 B2 * | 12/2004 | Suzuki et al. ................ 137/202 |
| 6,854,477 B2 * | 2/2005 | Yamada et al. .............. 137/202 |
| 7,014,214 B2 * | 3/2006 | Kaneko .................... 285/141.1 |
| 7,066,498 B2 * | 6/2006 | Kertesz ...................... 137/202 |
| 7,090,262 B2 * | 8/2006 | Kurihara et al. ............. 285/423 |
| 7,267,376 B2 * | 9/2007 | Isayama et al. ............. 285/423 |
| 7,320,769 B2 * | 1/2008 | Aoki et al. ................... 264/250 |

* cited by examiner

*Primary Examiner*—David E Bochna
(74) *Attorney, Agent, or Firm*—Kratz, Quintos, Hanson, LLP

(57) ABSTRACT

A joint part includes a connection part weldable on the tank and a tube part including an inner circumferential face. An inner tube is fitted inside and in contact with the inner circumferential face. The tube and the inner tube include materials having different swelling rates when exposed to the fuel to be stored in the tank. An end of the tube, and an end of the inner tube corresponding in an axial direction with the end of tube, include slopes therearound in contact with each other. The slopes are inclined from the axial direction. When the tube and the inner tube swell due to being wet with the fuel, the slopes have a relative displacement in the axial direction and in a radial direction of the tube and the inner tube, with contact therebetween.

11 Claims, 4 Drawing Sheets

CONNECTION TUBE FOR FUEL TANK

BACKGROUND OF THE INVENTION

1. Field of the Invention

The present invention relates to a connection tube for a fuel tank and particularly to a fuel tank mounted on a vehicle for filling fuel.

2. Description of the Related Art

Recently, fuel tanks which are made of plastic by blow molding become a trend as fuel tanks mounted on vehicles from a viewpoint of rust prevention and a lightweight requirement. Generally, to the fuel tank are attached various structural parts such as a vent valve for maintaining an internal pressure of the fuel tank by introducing a fuel vapor gas at a space above a liquid level to the outside of the fuel tank and a fuel service valve (backflow valve) connected to a filler tube. In a case of the plastic fuel tank, these structural parts are generally attached to the fuel tank by a heat welding method from a viewpoint of simplifying a production process.

U.S. Pat. No. 6,808,209 discloses a connection tube for a plastic fuel tank as an attachment. The connection tube has an outer tube connectable to a filler tube and an inner tube, formed of an HC (hydrocarbon) barrier material which is different from a material of the outer tube, for receiving and feeding fuel to the fuel tank.

SUMMARY OF THE INVENTION

An aspect of the present invention provides a connection tube for a fuel tank having an opening, comprising: a joint part including an weldable part weldable on the fuel tank at the opening and a connection tube part including an inner circumferential face; and an inner tube, fitted in the inner circumferential face, contacting the inner circumferential face, the connection tube part and the inner tube comprising materials having different swelling rates against a fuel to be stored in the tank, wherein one end of the connection tube part and one end of the inner tube include slopes therearound in contact with each other, respectively, the slopes being inclined from the axial direction of the connection tube part and the inner tube, wherein when the connection tube part and the inner tube swell due to wet with the fuel, the slopes have relative displacement in the axial direction and a radial direction of the connection tube part and the inner tube with contact therebetween.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the related art mentioned above will be further described. In U.S. Pat. No. 6,808,209, the inner tube formed of the HC (hydrocarbon) barrier material has a different swelling rate regarding fuel from the outer tube, so that deformation or a stress may occur when the connection tube is wet with the fuel because the HC barrier material has a higher selling rate than the outer tube. Further, there is no evacuation space of the inner tube made of the HC barrier material without protrusion toward a fuel passage thereof when the connection tube is wet with fuel. The inventors have developed a connection tube to eliminate these problems.

FIRST EMBODIMENT

Will be described a first embodiment according to the present invention, wherein the present invention is applied to a fuel filling valve as a connection tube, connected to a filler tube, in a fuel tank made of plastic mounted on a vehicle.

Figure 1:
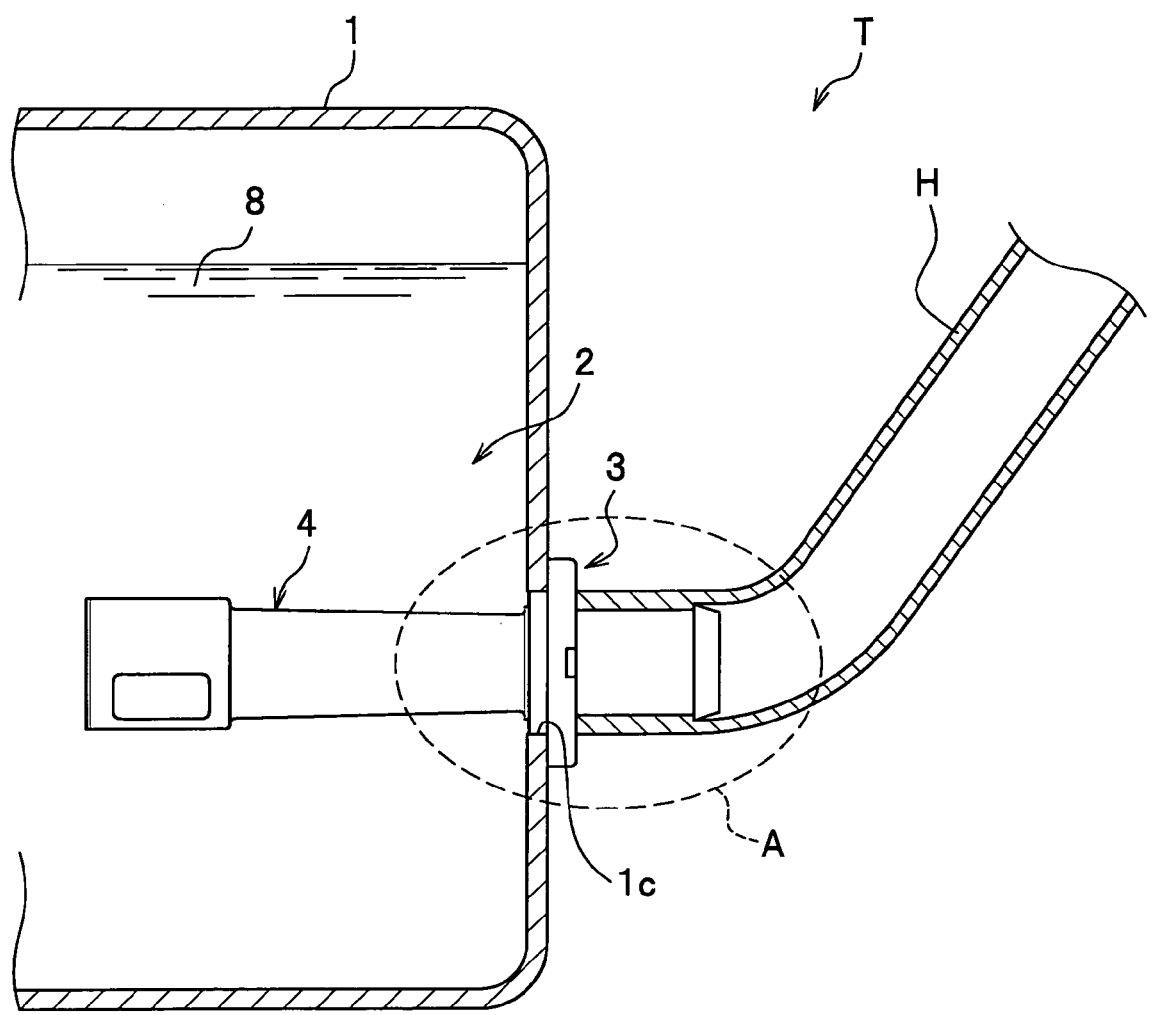
FIG. 1 is a partially cross-sectional side elevation view of a connection tube according to the present invention and a fuel tank.

FIG. 1 shows a fuel tank T in a partially cross-sectional view. The fuel tank T includes a tank body 1 made of plastic for storing gasoline 8 as a fuel. The tank body 1 has an opening 1c at a side of the tank 1 to which a fuel filling valve 2 is attached by welding. The fuel filling valve 2 includes, as the connection tube, a joint part 3 having a flange 3a weldable on an outside edge of the opening 1c and a connection tube part 3b extending outwardly from the flange 3a. The fuel filing valve 2 further includes an inner tube 4 having one end (at the left in FIG. 1) that includes a valve mechanism (not shown) built therein and extends to the other end thereof inside the joint part 3 with a hook 4a (see FIG. 2). In other words, the inner tube 4 extends from the one end inside the tank body 1 through the joint part 3 and exposed to the outside as the hook 4a. The valve mechanism has a function for preventing the fuel from reversely flowing to the filler tube H.

Figure 2:
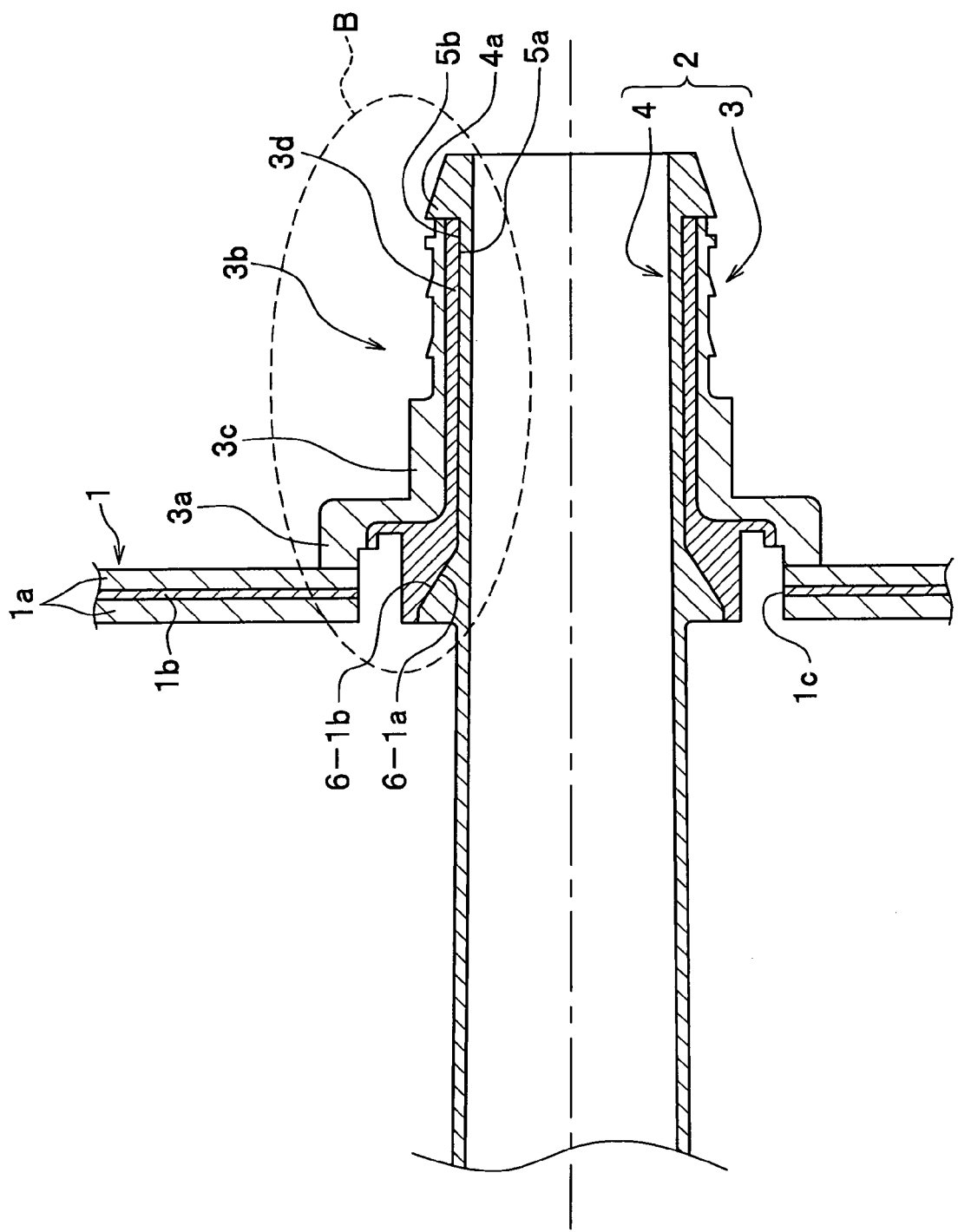
FIG. 2 is a cross-sectional enlarged side elevation view of the connection tube of a first embodiment according to the present invention to show a part indicated by "A" shown in FIG. 1.

FIG. 2 shows an enlarged cross-sectional elevation view of the filling valve 2 fixed to the tank body 1. The tank body 1 has a sectional structure, in which an HC barrier material layer 1b made of EVOH (Ethylene vinyl alcohol copolymer) excellent in impermeability against HC (hydrocarbon) and the like is sandwiched between heat welding layers 1a made of a material which can be heat-welded such as PE (polyethylene).

The joint part 3 of the fuel filling valve 2 includes the flange 3a attachable by heat-welding to the outside edge of the opening 1c and the connection tube part 3b, extending from the flange 3a outwardly from the tank body 1, to which the filler tube H (see FIG. 1) externally fits. The flange 3a and an outer circumferential face of the connection tube part 3b are made of, for example, PE (polyethylene), which can be heat-welded, as a heat welding layer 3c which can be heat-welded on the tank body 1. On the other hand, a part continuously formed from a side exposed to the inside of the tank body 1 and across inner circumferential face of the connection tube part 3b is made of the material excellent in impermeability against HC (hydrocarbon) such EVOH (Ethylene vinyl alcohol copolymer) as an HC barrier material layer 3d. A permeability of HC (hydrocarbon) in the tank body 1 to outside of the tank body 1 is suppressed by this HC barrier material layer 3d. The heat-welding layer 3c and the HC barrier material layer 3d are formed by coinjection molding to provide an integrated joint part 3.

Figure 3:
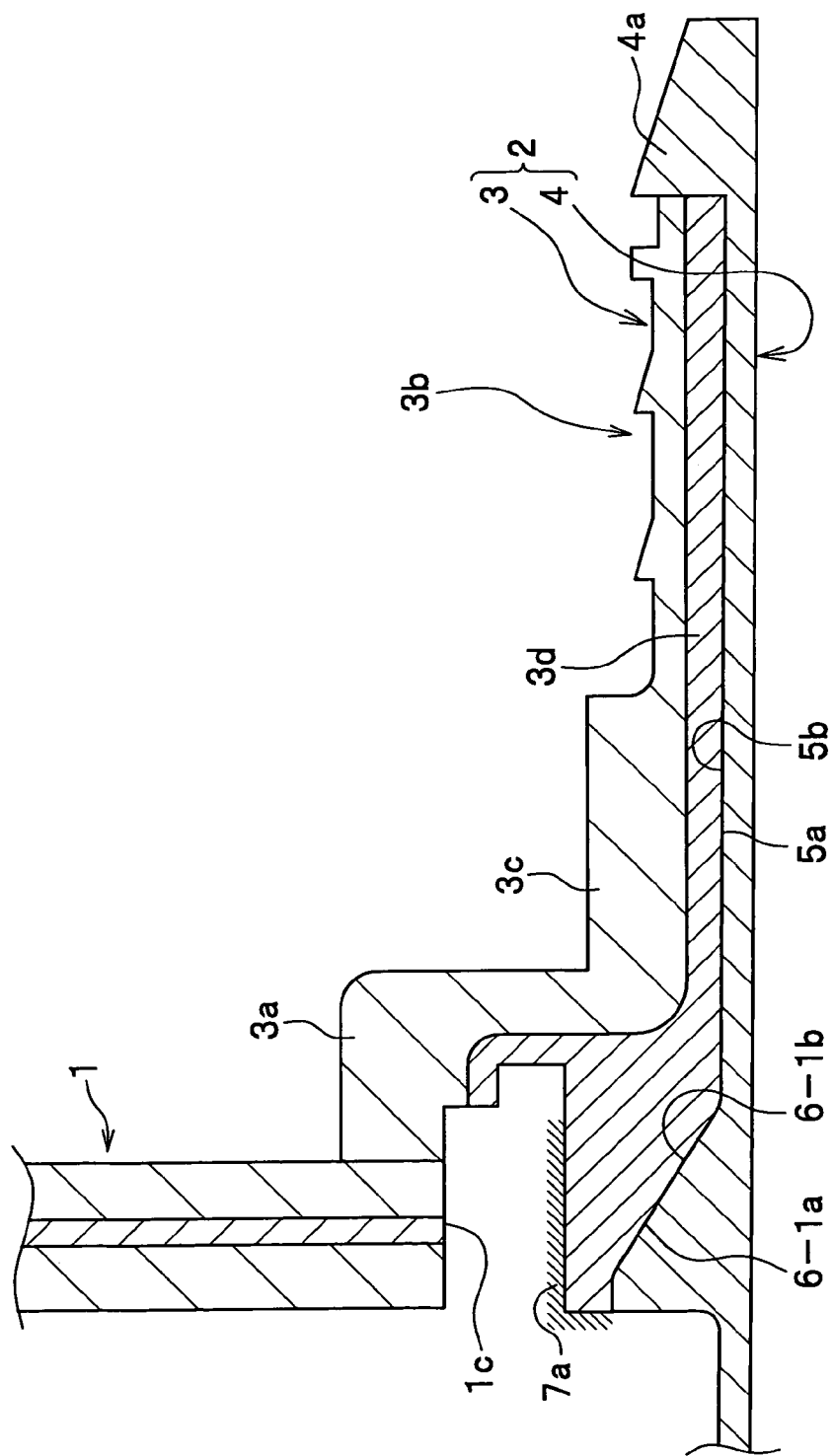
FIG. 3 is a cross-sectional enlarged side elevation view of a part indicated by "B" shown in FIG. 2.

FIG. 3 shows a further enlarged cross-sectional side elevation view of a part "B" of the filling valve 2 shown in FIG. 2. The inner tube 4 is formed to contact an inner circumferential face of the joint part 3, namely, an inner circumferential face of the connection tube part 3b (the HC barrier material layer 3d). At a tip of the inner tube outside the tank body 1 is formed the hook 4a radially outwardly protruding from the tip. The hook 4a has a wall, radially extending from the inner tube 4, which contacts with a tip of the connection tube part 3b to stop an outward movement in an axial direction of the connection tube part 3b (fuel filling valve). The inner tube 4 is formed of a material that cannot be welded such as POM (polyacetal). In this embodiment, the joint part 3 and the inner tube 4 are integrally formed. More specifically, the fuel filling valve 2 is integrally formed by a so-called insert molding, in which the part of POM is inserted into the joint part 3.

Here, the EVOH, which is the material of the HC barrier material layer 3d, and the POM, which is a material of the inner tube 4, have different swelling rates against gasoline, wherein the EVOH has a greater swelling rate than the POM. Thus, the joint part 3 and the inner tube 4 have different swelling rates around the contact faces 5a and 5b against the fuel, respectively.

In consideration of this, in the present invention, at least one pair of the ends of the contact faces 5a and 5b with respect to the axial direction of the fuel filling valve 2 are made to contact with each other at slopes 6-1a and 6-1b that incline from the axial direction to provide relative displacement in the axial direction and radial direction of the fuel filling valve 2 to have hermetically, slidingly contact with each other when the joint part 3 and the inner tube 4 contact the fuel (gasoline 8) and thus swell differently.

FIG. 3 shows a case where, as the at least one pair of ends of the contact faces 5a and 5b, the ends exposed in the tank body 1 are formed to have the slopes 6-1a and 6-1b. In this case, the slopes 6-1a and 6-1b radially outwardly displaces as points thereat move toward the inside of the tank body 1 (a wall of the tank body 1) and formed around the circumference of the inner tube 4.

As mentioned above, in the structure where the joint part 3 and the inner tube 4 are intervened with the slopes 6-1a and 6-1b, if the HC barrier material layer 3d made of EVOH having a higher swelling rate than the POM of the inner tube 4, deformation can be absorbed by the relative displacement between both the slopes 6-1a and 6-1b in the axial direction and the radial direction. More specifically, the slope 6-1b relatively shifts to the left in FIG. 3 along the slope 6-1a of the inner tube 4. In other words, the deformation of the joint part 3 caused by the difference in the swelling rate is relived between the slopes 6-1a and 6-1b. In that event, the slope 6-1b pushes the slope 6-1a as it slidingly shifts, so that the slopes 6-1a and 6-1b hermetically contact. This provides a sealing characteristic at the contact faces 5a and 5b. In addition, the slope 6-1a and 6-1b function as a stopper for preventing the joint part 3 from coming out of the inner tube 4.

According to this structure, the displacement is allowed in the axial direction at the slopes 6-1a and 6-1b at one end of the HC barrier material layer 3d, although the joint part 3 (HC barrier material layer 3d) is limited in displacement at the other end of the HC barrier material layer 3d. As a result, no excessive load is generated in the joint part 3 and the inner tube 4. In addition, provided at the end of the HC barrier material layer 3d inside the tank body 1 (near the slopes 6-1a and 6-1b) is a relief space 7a, so that the swelled HC barrier material layer 3d extends to the relief space 7a, which allows the slopes 6-1a and 6-1b to surely relieve the deformation.

SECOND EMBODIMENT

Figure 4:
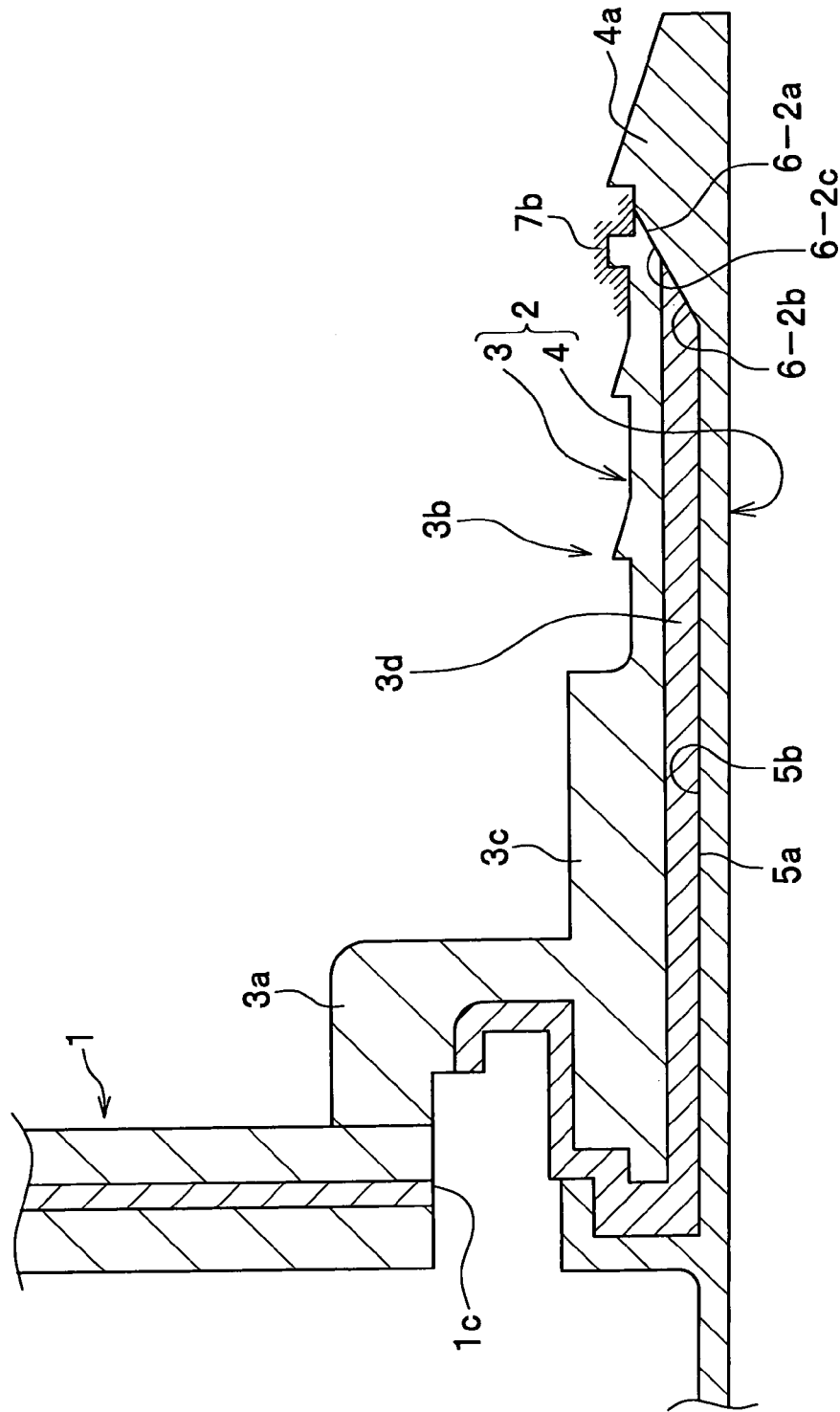
FIG. 4 is a cross-sectional enlarged side elevation view of the connection tube of a second embodiment according to the present invention.

FIG. 4 shows a second embodiment in a case where, as the at least one pair of ends of the contact faces 5a and 5b, the ends at the outside of the tank body 1 are formed to have the slopes 6-2a and 6-2b. In this embodiment, the slopes 6-2a and 6-2b are formed to have radial, outward displacement as places at the slopes 6-2a and 6-2b move outwardly from the tank body 1. The HC barrier material layer 3d swells relative to the inner tube 4, so that the slope 6-2b of the HC barrier material layer 3d slidingly and hermetically climbs the slope 6-2a of the inner tube 4, which relieves the stress at the slope 6-2a and the 6-2b.

In addition, provided above a tip of the heat-welding layer 3 and a space between the tip of the heat-welding layer 3 and the hook 4a outside the tank body 1 is a relief space 7b, so that the swelled HC barrier material layer 3d extends to the relief space 7b, which allows the slopes 6-2a and 6-2b, and a corresponding slope 6-2c of the connection tube 3b to surely relieve the deformation.

In the first and second embodiments, the joint part 3 and the inner tube 4 are integrally formed. However, the present invention is applicable to a case where the joint part 3 and the inner tube 4 are separately formed. Further, the slopes 6-1a, 6-1b, 6-2a, and 6-2b may be formed at the both ends of the fuel filling tube 2.

Further, in the above-described embodiment, the fuel tank T is used in the automobile. However, the present invention is applicable to fuel tanks for other vehicle, ships, and aircraft and for an apparatus that stores a fuel.

In the first embodiment, the inner tube 4 has a wall perpendicular to the axial direction at the one end of the inner tube 4 (at the hook 4a), outwardly extending from the inner tube 4, to stop an outward movement (rightward in FIG. 3) of the connection tube part 3b. The hook 4a includes a taper, connected to the wall, extending in the axial direction to a tip of the inner tube 4 to receive and hook the external filler tube H.

In the first embodiment, the connection tube part 3b extends from the flange 3a along the inner tube 4 to cover the inner tube 4 as an outer tube that sandwiches the slope 6-1b of the HC barrier material layer with the slope 6-1a to generate a pressure from the slope 6-1b to the slope 6-1a to provide hermetical sealing with a pressure between the slopes 6-1a and 6-1b. In the first embodiment, the connection tube part 3b extends from the flange 3a along the inner tube 4 to cover the inner tube 4 as an outer tube that sandwiches the slope 6-1b of the HC barrier material layer 3d with the slope 6-1a to generate a pressure from the slope 6-1b to the slope 6-1a to provide hermetical sealing between the slopes 6-1a and 6-1b.

In the first and second embodiments, the inner tube 4 comprises a non-weldable layer which is not weldable on the fuel tank body 1, wherein the non-weldable layer comprises polyacetal.

In the second embodiment, the connection part 3b extends along the inner tube 4 to cover the inner tube 4 as the outer tube that sandwiches the slope 6-2b of the HC barrier material layer 3d with the slope 6-2a to generate a pressure from the slope 6-2b to the slope 6-2a to provide hermetical sealing with a pressure between the slopes 6-1a and 6-1b.

The invention claimed is:

1. A connection tube for a fuel tank having an opening, comprising: a joint part including a weldable part weldable on the fuel tank at the opening and a connection tube part including an inner circumferential face; and an inner tube, fitted in the inner circumferential face, and contacting the inner circumferential face, the connection tube part and the inner tube comprising materials having different swelling rates against a fuel to be stored in the tank, wherein one end of the connection tube part and one end of the inner tube include slopes therearound in contact with each other, respectively, the slopes being inclined from the axial direction of the connection tube part and the inner tube, wherein when the connection tube part and the inner tube swell due to wet with the fuel, the slopes have relative displacement in the axial direction and a radial direction of the connection tube part and the inner tube with contact therebetween;

wherein the connection tube part comprises a fuel barrier material layer having an impermeability regarding the fuel and the slope at the end of the connection tube part; and wherein the connection tube part extends along the tube to cover the inner tube as an outer tube that sandwiches the slope of the hydrocarbon-barrier material with the slope of the inner tube to generate a pressure from the slope of the fuel barrier maternal layer to the slope of the inner tube to provide hermetical sealing therebetween.

2. The connection tube as claimed in claim 1, wherein the slopes are displaced outwardly in the radial direction as points at the slopes move outwardly in the axial direction.

3. The connection tube as claimed in claim 1, further comprising a relief space adjacent to the end of the connection tube part.

4. The connection tube as claimed in claim 1, wherein the inner tube has a wall perpendicular to the axial direction at the other end of the inner tube, outwardly extending from the inner tube, to stop the connection tube part.

5. The connection tube as claimed in claim 4, wherein the inner tube comprises a taper, connected to the wall, extending in the axial direction to a tip of the inner tube to receive an external filler tube, and the wall hooks the external filler tube.

6. The connection tube as claimed in claim 1, wherein the slopes of the connection tube part and the inner tube are located at the side of the fuel tank when the fuel connection tube is welded on the fuel tank.

7. The connection tube as claimed in claim 1, wherein the slopes of the connection tube part and the inner tube are located opposite to the fuel tank when the fuel connection tube is welded on the fuel tank.

8. The connection tube as claimed in claim 1, wherein the fuel barrier material layer comprises ethylene vinyl alcohol copolymer.

9. The connection tube as claimed in claim 1, wherein the inner tube comprises a non-weldable layer which is not weldable on the fuel tank.

10. The connection tube as claimed in claim 9, wherein the non-weldable layer comprises polyacetal.

11. The connection tube as claimed in claim 9, wherein the weldable part comprises polyethylene.

* * * * *